Figure 1:
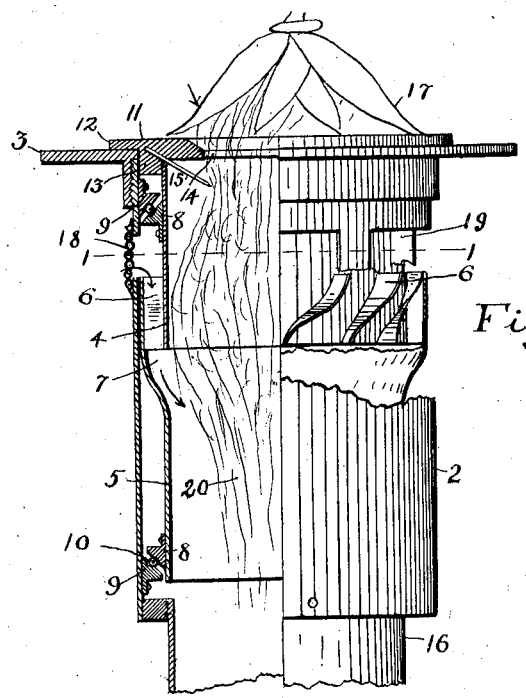

J. T. SKILLINS.
VACUUM NOZZLE FOR COTTON PICKING MACHINES.
APPLICATION FILED NOV. 29, 1918.

1,355,786. Patented Oct. 12, 1920.

Inventors;
John T. Skillins
by S. W. Bates
Atty.

UNITED STATES PATENT OFFICE.

JOHN T. SKILLINS, OF WESTBROOK, MAINE, ASSIGNOR TO DANA COTTON HARVESTER COMPANY, OF WESTBROOK, MAINE, A CORPORATION OF MAINE.

VACUUM-NOZZLE FOR COTTON-PICKING MACHINES.

1,355,786.     Specification of Letters Patent.     Patented Oct. 12, 1920.

Application filed November 29, 1918. Serial No. 264,534.

*To all whom it may concern:*

Be it known that I, JOHN T. SKILLINS, a citizen of the United States, residing at Westbrook, in the county of Cumberland and State of Maine, have invented certain new and useful Improvements in Vacuum-Nozzles for Cotton-Picking Machines, of which the following is a specification.

My invention relates to a vacuum nozzle for pneumatic cotton picking machines.

It relates particularly to that class of nozzles having a rotating picking tube operated by external propeller blades and connected by a flexible hose to a vacuum fan. The incoming air is partly drawn in through the open end of the tube and partly passes through the external propeller blades and thence into the air duct and through the flexible hose.

In practice the nozzle is presented to the boll of cotton and the incoming draft of air combined with the twisting action of the picking tube removes the cotton from the boll and sucks it into the flexible hose.

If the mass of cotton coming to the inlet of the picking tube is too large it is liable to obstruct the incoming air and choke up the mouth of the tube.

In these prior devices, that portion of the air which goes to the propeller blades has no immediate effect on drawing in the cotton other than to rotate the picking tube.

The object of my invention is to so construct the nozzle that the air which is drawn through the open end of the picking tube and the air which is drawn through the sides of the casing and propeller blades to produce rotation of the picking tube will together act on the cotton to facilitate its passage into and through the picking tube. As I construct my nozzle, one portion of the air acts directly to force the cotton into the tube and longitudinally through it and the other portion of the air takes effect on the lower end of the cotton staple and tends to draw it in through the mouth of the tube.

Thus both currents of air are at each operation made to act directly on the incoming cotton, one at the mouth and one in the body of the tube sufficiently near the mouth to seize, or force inward, the lower end of the mass of cotton and the air current passing through the propeller blades acts at the same time to rotate the picking tube.

I have illustrated my invention by means of the accompanying drawing in which I show one form of my vacuum picking nozzle well adapted to carry out my invention.

Figure 2:
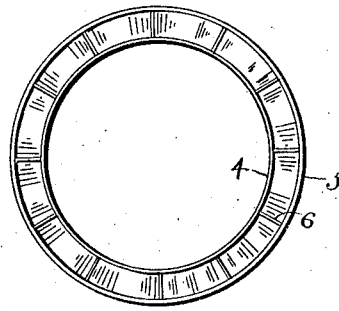
Figure 3:
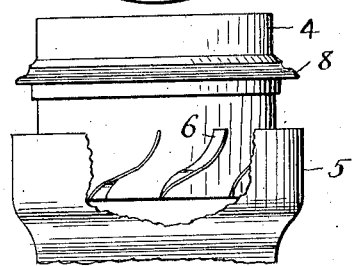

Referring to the drawing,

Figure 1 represents a half longitudinal section and half elevation, the latter being cut away in certain portions to show the inside construction, Fig. 2 is a section on the line 1—1 of Fig. 1 omitting the strainer ring and, Fig. 3 is an elevation of the upper portion of the picking tube with a portion cut away.

As herein shown, the nozzle is made up of a cylindrical outer casing 2 to the upper end of which is attached a flange 3.

In describing and claiming the picking tube for the sake of clearness of description, I am assuming that it is in a normally upright position as shown, although it is evident that when in use it may be held in any position by the hand of the operator.

The rotating picking tube is located inside the casing 2 and is made up of two portions, an upper part 4 and a lower part 5. These two portions are preferably sections of a tube having the same diameter and the lower section is shown as expanded somewhat to considerably larger diameter than that of the upper section.

The upper section 4 extends down inside of the expanded upper end of the lower section 5 and the two are joined together by vanes or buckets 6 which are interposed between the two parts and brazed or soldered to each tube section. These vanes or buckets are curved in such a way that as the air is drawn through them, they act as propeller blades to rotate the picking tube.

The space between the two tubes occupied by the propeller blades terminates at its lower end in an inclined annular opening which opens into the interior of the tube in an inward and downward direction.

Air inlets as 19 are formed in the casing 2 which allow the air to be drawn through the casing and to pass directly down through the propeller blades into the interior of the picking tube entering the latter through the annular opening 7 in a downward and inward direction. A suitable strainer ring 18 surrounds the air opening to exclude cotton and dirt from being drawn in at this point.

The length of the upper end of the picking tube down to the openings 7 is made relatively short so that this opening will be as near as possible to the upper end of the nozzle for the reason hereinafter more fully set forth.

The picking tube is supported inside of the casing by means of ball bearings which consist of a pair of conical ball races 8, 8, one at the upper end the other at the lower end of the picking tube and a pair of opposed ball races 9, 9 secured to the inner surface of the casing with a ball 10 adapted to run between them.

For the purpose of excluding dust and dirt from the ball bearings, I secure to the upper end of the picking tube a dust-ring 11 which has a flange 12 at its upper edge extending out over the flange 3 and in close proximity thereto and an annular portion 13 which extends down into the space between the picking tube and the casing with a relatively close fit which will just allow the picking tube to rotate.

This ring is contracted in the center so as to form a relatively narrow entrance 14 into the interior of the picking tube.

Picking fingers 15 are secured to the dust-ring 11 just below the opening 14 and act to catch the cotton fibers of the boll and to twist them as they are drawn out.

A tube or extension 15 is connected with the lower end of the casing for the passage of air and cotton and to this tube the exhaust-hose may be secured whereby connection is made with the exhaust fan.

I have represented herein a boll of cotton with the cotton fibers being drawn down through the picking tube for the purpose of illustrating the effect of my construction in the operation of the picking nozzle.

In the illustration, 17 represents the husk and 20 represents the cotton fibers as they are drawn through the picking tube.

In operation, the picking tube is presented to the boll of cotton, the fibers are seized and twisted by the picking fingers and are drawn into the upper end of the picking tube by the force of the incoming air which enters through the opening 14.

As soon as the cotton passes through the opening 14, which is considerably smaller in the interior than the diameter of the picking tube, the air which is slightly compressed tends to expand and throw the fiber out toward the walls of the picking tube.

This effect is accentuated by the centrifugal motion of the picking tube and if this motion was not counteracted the staple would hug the inner surface of the tube creating a considerable amount of friction and retarding the passage of the cotton.

When the cotton reaches the mouth 7 where the air enters which is passed through the propeller blades, it is blown inward and downward away from the walls of the picking tube and into the middle of the tube so that its progress downward is very materially accentuated.

As the boll is drawn against the upper end of the nozzle there is a tendency to obstruct the incoming air and so retard the inward movement of the cotton.

This tendency to check the inward movement of the cotton when the main entrance is obstructed is overcome by the air which enters below and which in effect seizes the lower portion of the mass of cotton and assists in drawing it through the opening and passing it through the picking tube.

Again, if the main opening is obstructed by the cotton, a greater proportion of the air is drawn through the propeller blades, the picking nozzle rotates more rapidly and a heavier air blast is directed against the body of the cotton tending to draw it through the opening.

The lower current coming in through the blades has a tendency to keep the cotton concentrated in the center of the picking tube and reduces the friction by keeping it away from the walls of the tube.

The forcing of a large body of air into the cotton has a beneficial effect in separating the fibers and reducing them to the "fluffy" condition very desirable in ginning the cotton.

A picking nozzle constructed in accordance with my invention is capable of doing the work very successfully and of removing the cotton from the boll and passing it into the hose without danger of clogging.

There is substantially no tendency to clog as two air currents act at the same time on the cotton of each boll, the lower air current acting on the inner end of the cotton as soon as it is well within the nozzle. For this reason it is desirable to have the passage 7 as near the upper end as possible. It should be immediately below the blades and should point downward and inward toward the center of the picking tube. The blades should be placed as near as possible to the upper end of the nozzle so that the lower air current can take effect as soon as possible.

It is evident that the construction herein shown may be varied as to its details without departing from the spirit of my invention as expressed in the claims.

I claim:

1. In a vacuum nozzle for cotton picking machines, the combination of a casing, a cylindrical picking tube within said casing having an upper and lower section, the upper end of the lower section being expanded to form an enlarged upper end within which the upper section fits, propeller blades interposed between the lower end of the upper section and the enlarged end of the lower section forming an annular opening below said blades communicating with the interior of the picking tube.

2. In a vacuum nozzle for cotton picking machines, the combination of a casing, a rotatable picking tube within said casing, a series of propeller blades secured to the outside of said picking tube between the picking tube and the casing, an air passage being formed from the blades to the interior of the picking tube for discharging the air passing through said blades, said passage being near enough to the inlet end of the tube so that the incoming air will act on the cotton before the same passes entirely through said inlet end.

In testimony whereof I affix my signature.

JOHN T. SKILLINS.